United States Patent
Jaulin et al.

(10) Patent No.: US 12,096,496 B2
(45) Date of Patent: Sep. 17, 2024

(54) METHOD FOR CONNECTING A COMMUNICATION NODE AND COMMUNICATION NODE

(71) Applicant: SAGEMCOM BROADBAND SAS, Rueil Malmaison (FR)

(72) Inventors: Jean-Philippe Jaulin, Rueil Malmaison (FR); Laurent Alarcon, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 374 days.

(21) Appl. No.: 17/769,973

(22) PCT Filed: Oct. 16, 2020

(86) PCT No.: PCT/EP2020/079262
§ 371 (c)(1),
(2) Date: Apr. 18, 2022

(87) PCT Pub. No.: WO2021/074412
PCT Pub. Date: Apr. 22, 2021

(65) Prior Publication Data
US 2022/0361261 A1 Nov. 10, 2022

(30) Foreign Application Priority Data

Oct. 18, 2019 (FR) ...................... 1911705

(51) Int. Cl.
*H04W 8/20* (2009.01)
*H04L 12/14* (2024.01)
(Continued)

(52) U.S. Cl.
CPC ......... *H04W 76/12* (2018.02); *H04L 61/4511* (2022.05); *H04L 61/5014* (2022.05)

(58) Field of Classification Search
None
See application file for complete search history.

(56) References Cited

U.S. PATENT DOCUMENTS

2007/0223381 A1* 9/2007 Radtke ............... H04B 3/54
370/236
2008/0254833 A1* 10/2008 Keevill ............... H04W 88/08
455/558
(Continued)

FOREIGN PATENT DOCUMENTS

WO 2007/096884 A2 8/2007
WO 2015/075569 A1 5/2015

OTHER PUBLICATIONS

Avm Gmbh; "FRITZ!Box 6842 LTE Einrichten und bedienen;" 2014; pp. 1-212, Retrieved from: URL:http://img.billiger.de/dynimg/H5r90H8yeGyX90aFpmTDmHt4H9rycHjeBa9LTdXG2DA41-ZtYq5viO3IVPqWBj4_HexpdHaClz88YR5bxwk6-U/Bedienungsanleitung.pdf.

(Continued)

*Primary Examiner* — Sai Aung
(74) *Attorney, Agent, or Firm* — Williams Mullen; R. Brian Drozd

(57) ABSTRACT

A method for connecting a node of a wireless-communication coverage-extension system is provided. The node determines whether it has been moved out of an initial local area network. In the case where the node has been moved, a local area network is established from the moved node by activating an address server functionality. The moved node is then connected to a point of access to the internet. A secure tunnel is next established between the moved node and a master node coordinating the initial local area network. The address server functionality is then deactivated and a client functionality of an address server of the initial local area network is activated.

9 Claims, 7 Drawing Sheets

(51) Int. Cl.
*H04L 61/4511* (2022.01)
*H04L 61/5014* (2022.01)
*H04W 76/12* (2018.01)
*H04W 76/30* (2018.01)

(56) References Cited

U.S. PATENT DOCUMENTS

| | | | | |
|---|---|---|---|---|
| 2013/0304616 | A1* | 11/2013 | Raleigh | H04M 15/43 |
| | | | | 705/34 |
| 2015/0207777 | A1* | 7/2015 | Chilla | H04W 88/06 |
| | | | | 709/203 |
| 2016/0210578 | A1* | 7/2016 | Raleigh | G06Q 30/0284 |
| 2017/0272273 | A1 | 9/2017 | Singla et al. | |
| 2018/0041934 | A1* | 2/2018 | Agarwal | H04L 65/65 |
| 2019/0380026 | A1* | 12/2019 | Lee | H04W 8/26 |

OTHER PUBLICATIONS

Nov. 10, 2020 Search Report issued in International Patent Application No. PCT/EP2020/079262.

* cited by examiner

METHOD FOR CONNECTING A COMMUNICATION NODE AND COMMUNICATION NODE

TECHNICAL FIELD

At least one embodiment relates to a method for connecting a node of a wireless-communication coverage-extension system. At least one embodiment relates to a communication node implementing said method.

PRIOR ART

In local area networks LAN, wireless-communication coverage-extension systems can be used in order to increase the range of these local area networks LAN by coordinating a plurality of distributed access points AP. These various access points AP are integrated in communication nodes, simply referred to hereinafter as nodes, interconnected by means of a backhaul subnetwork and all making available one and the same wireless local area network WLAN. In the context of Wi-Fi (registered trade mark) technology, all these access points AP thus use the same identifier SSID (Service Set IDentifier) and the same password (also referred to as a security key). Thus the extension of wireless communication coverage is transparent for the devices connected to the wireless local area network WLAN.

FIG. 1 illustrates schematically a communication system comprising a wireless-communication coverage-extension system constructed around a backhaul network comprising a set of interconnected nodes N1 121, N2 122, N3 123. Thus each node N1 121, N2 122, N3 123 in the backhaul subnetwork comprises a plurality of radio interfaces:

- a so-called "AP-BH" (standing for "Access Point Backhaul") radio interface corresponding to an access-point interface of the backhaul subnetwork,
- an "ST-BH" (standing for "Station Backhaul") radio interface corresponding to a client interface of the backhaul subnetwork,
- an "AP-FH" (standing for "Access Point Fronthaul") radio interface corresponding to an access-point interface of the local area network LAN1, this interface being dedicated to associating stations or terminals.

In the context of Wi-Fi (registered trade mark) technology, all these access points AP-FH thus use the same SSID identifier and the same password. The coverage area of the local area network LAN1 thus formed around the wireless-communication coverage-extension system is then extended transparently for each terminal, or station, that connects thereto.

The nodes N1 121, N2 122, N3 123 of the backhaul subnetwork are connected to each other by means of a structure in the form of a tree, a node then being able to serve as a relay between two other nodes in the backhaul subnetwork. The nodes N1 121, N2 122, N3 123 are thus interconnected by means of cable connections, for example of the Ethernet type, or wireless connections. The nodes N1 121, N2 122, N3 123 of the backhaul subnetwork thus communicate with each other by means of logic links, for example IP communications or encrypted tunnels or communications in accordance with a proprietary communication protocol. These logic links are typically established by means of probe and discovery messages. However, when a cable interface is used for the backhaul subnetwork, this cable interface cannot be used for another purpose, in particular for connecting a terminal thereto.

For illustration, FIG. 1 shows that the node N1 121 is connected to the node N2 122 by means of a wireless connection between the access-point radio interface AP-BH of the node N1 121 and the client radio interface ST-BH of the node N2 122. The node N1 121 is also connected to the node N3 123 by means of a wireless connection between the access-point radio interface AP-BH of the node N1 121 and the client radio interface ST-BH of the node N3 123. On FIG. 1, the wireless connections are shown in solid lines and the wireless connections in broken lines. The connections between two nodes of the backhaul subnetwork are called backhaul connections and may be cable or wireless.

The wireless-communication coverage-extension system thus makes it possible to interconnect a gateway GW1 110 for access to the internet 120, a terminal T1 131, a terminal T2 132, a terminal T3 133 and a terminal T4 134. The terminal T1 131 is connected by a wireless connection to the node N2 122. The terminal T1 131 is thus connected to the local area network LAN1 by means of the node N2 122 acting as a so-called fronthaul access point. The terminal T1 131 is for example a smartphone or a tablet. The terminal T2 132 is for example a PC connected by a wireless connection to the node N3 123. The terminal T3 133 is for example a television connected by a cable connection, shown in a solid line, to the gateway GW1. The terminal T4 134 is for example a network attached storage unit NAS connected by a cable connection to the gateway GW1.

The nodes of the backhaul subnetwork are coordinated in a centralised manner, by a master node, e.g. the node N1 121 on FIG. 1, selected from said nodes of the backhaul subnetwork. All the nodes of the backhaul subnetwork thus have knowledge of the master node, and are capable of identifying it by means of its MAC address and/or its network address (e.g. IP address). All the nodes of the backhaul subnetwork also have knowledge of all the other nodes of the backhaul subnetwork and are capable of identifying them by means of their MAC addresses and/or their network addresses (e.g. IP addresses).

The terminals thus connected to the local area network LAN1 can benefit from various services. For example, the network storage unit NAS (T4 134) can propose to the PC (T2 132) the installation of a network disc by means of a particular protocol, e.g. the Samba protocol. The tablet (T1 131) can send a video stream to a connected TV (T3 133) using a particular protocol of the Chromecast type.

Since the terminals T1 and T2 are no longer connected to the same LAN as the terminals T3 and T4, these services are no longer available. This is the case in particular if the terminal T1 131 or T2 132 is moved by a user, e.g. when going on holiday.

Using IP tunnels for creating virtual private networks, referred to as VPNs, is known. SSL (the English acronym for "Secure Sockets Layer") and its successor TLS (the English acronym for "Transport Layer Security") are protocols used by the VPN. This solution makes it possible to cause two distant portions of the same local area network to communicate in a secure manner by using a third-party network. However, it requires establishing as many VPNs are there are terminals to be connected. Thus, in the case of FIG. 1, if the terminals T1 and T2 are moved, for example to a holiday site, it is necessary to establish two VPNs, i.e. one for each terminal. This solution is therefore expensive to implement.

Furthermore, this solution requires prior knowledge of the address of the remote LAN network, as well as access parameters for establishing the communication, in the same way as is used for remotely connecting to the corporate network when moving to a third-party network. Such a solution is therefore complicated to implement for a novice user.

It is then desirable to overcome these drawbacks of the prior art.

DISCLOSURE OF THE INVENTION

According to a first embodiment, a method for connecting a node of a wireless-communication coverage-extension system is described. The wireless-communication coverage-extension system comprises a backhaul subnetwork in tree form comprising a set of nodes interconnected by wireless or cable by so-called backhaul connections. A plurality of backhaul subnetwork nodes implement an access-point functionality of one and the same wireless communication network. The wireless-communication coverage-extension system is adapted for making it possible to connect devices to said nodes by means of the wireless communication network or by cable in order to form an initial local area network. The connection method comprises the following steps performed by the node to be connected:

determining whether said node has been moved out of said initial local area network;

and, in the case where the node has been moved:

establishing a local area network from said moved node by activating an address-server functionality;

connecting said moved node to a point of access to the internet;

establishing a secure tunnel between said moved node and a master node coordinating said initial local area network;

deactivating the address-server functionality and activating a client functionality of an address server of said initial local area network.

In a particular embodiment, determining whether said node has been moved out of said initial local area network comprises:

attempting to establish, during a predefined time, a backhaul connection between said node and at least one other node of said backhaul subnetwork;

determining that said node has been moved out of said initial local area network in the case where said attempt has failed.

In a variant, determining whether said node has been moved out of said initial local area network comprises: determining that said node has been moved out of said initial local area network in the case where a list of access points visible to a radio interface of said node is very different from a second list of access points stored in memory, said second list being a list of access points that were visible to said radio interface when said node was in said initial local area network.

In a particular embodiment, establishing a local area network from said moved node by activating an address-server functionality comprises:

putting its access-point functionality of said wireless communication network in operation;

establishing a DHCP server functionality and a DNS server functionality; and sending a DHCP lease to the terminals that so request.

In a particular embodiment, connecting said moved node to a point of access to the internet comprises:

determining a list of at least one access point to which said node can connect;

selecting an access point in said list from a web page displayed on a screen of a terminal connected to said moved node; and connecting said moved node to said selected access point.

In a particular embodiment, said selected access point is a first access gateway to the internet.

In a particular embodiment, establishing a secure tunnel between the moved node and said master node, said master node being connected to a second access gateway to the internet, comprises:

a) sending a connection request to a domain name corresponding to said second gateway through a predefined port, said connection request comprising a client certificate of said moved node signed by a root certificate of a current node; and b) if said client certificate is received and validated by said master node:

receiving a server certificate of said master node signed by a root certificate of said master node;

validating the server certificate received using the root certificate of said master node;

establishing a tunnel between said node and said master node;

c) otherwise repeating the steps a) to c) until said tunnel is established between said node and said master node, said steps being repeated with said connection request comprising a client certificate of said moved node signed by a root certificate of another node different from said current node.

A node of a wireless-communication coverage-extension system is also described. The node is configured for performing the steps of the connection method according to one of the embodiments described above.

A computer program is described. The computer program comprises instructions for implementing, by a node of a backhaul subnetwork of a wireless-communication coverage-extension system, the connection method according to one of the embodiments described above, when said program is executed by a processor of said node.

Storage means are described. The storage means store a computer program comprising instructions for implementing, by a node of a backhaul subnetwork of a wireless-communication coverage-extension system, the connection method according to one of the above embodiments, when said program is executed by a processor of said node.

BRIEF DESCRIPTION OF THE DRAWINGS

The features of the invention mentioned above, as well as others, will appear more clearly from the reading of the following description of an example embodiment, said description being made in relation to the accompanying drawings, among which.

DETAILED DISCLOSURE OF EMBODIMENTS

At least one embodiment makes it possible to connect a node to its original local area network, referred to as the initial local area network, after said node has been moved to another local area network, and thus to offer to the mobile terminals that are connected thereto the services offered by the initial local area network.

Figure 2:
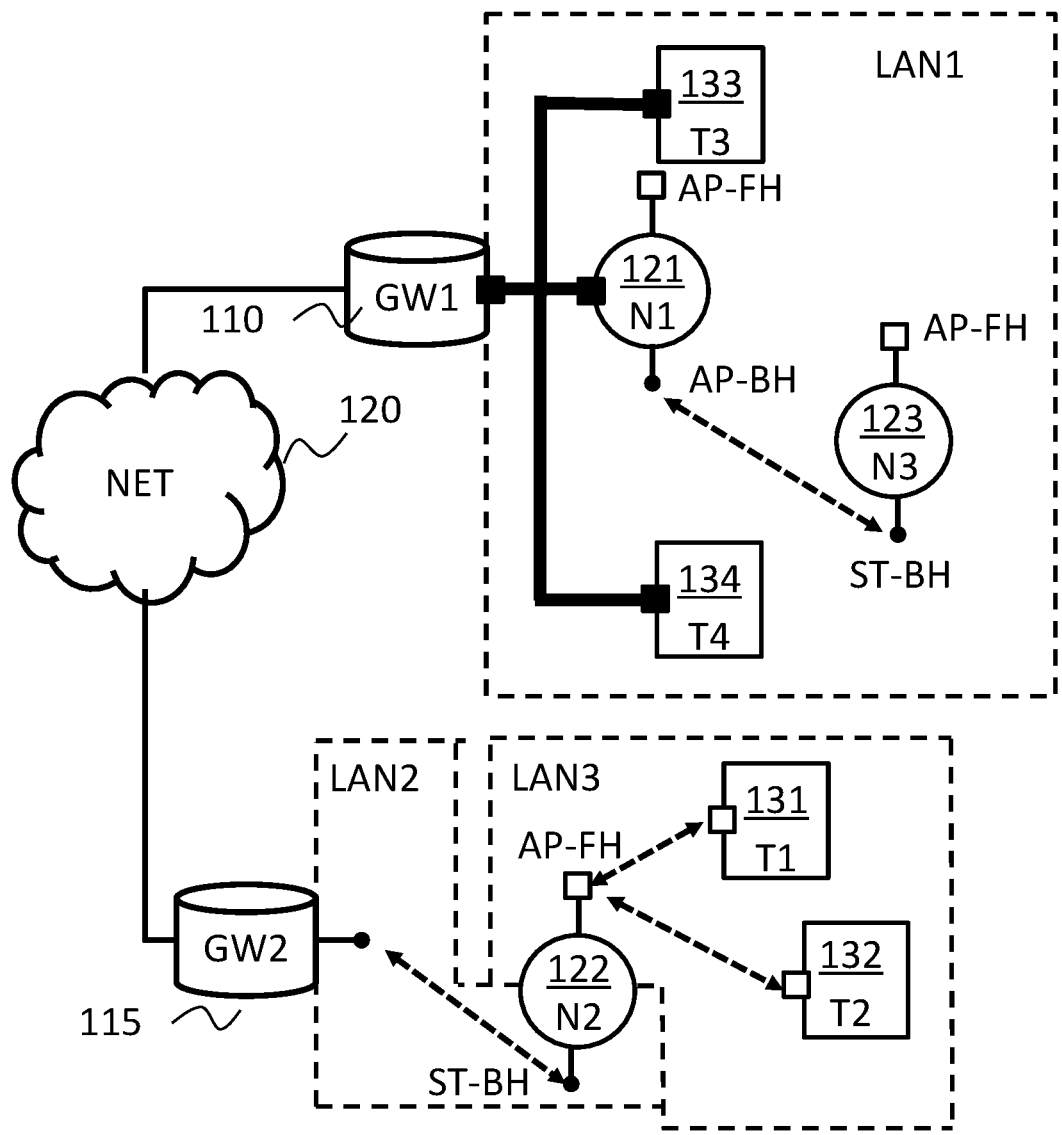
FIG. 2 illustrates schematically the architecture of a communication system comprising a wireless-communication coverage-extension system constructed around a backhaul subnetwork comprising a set of interconnected nodes according to a particular embodiment.

FIG. 2 illustrates schematically a communication system comprising a wireless-communication coverage-extension system constructed around a backhaul subnetwork comprising a set of interconnected nodes N1 121, N2 122, N3 123. The nodes N1 121, N2 122, N3 123 initially form part of one and the same initial local area network LAN1. The node N2 122 was next moved out of this initial local area network LAN1. For example, the node N2 122 was moved by a user who took it to his holiday site. On this figure, the moved node or nomadic node N2 122 is connected by its radio interface ST-BH to an access gateway to the internet GW2 115. The gateway GW2 has a local area network LAN2. In the remainder of the document, the nodes N1 121, N2 122 and N3 123 are called respectively N1, N2 and N3.

Figure 3:
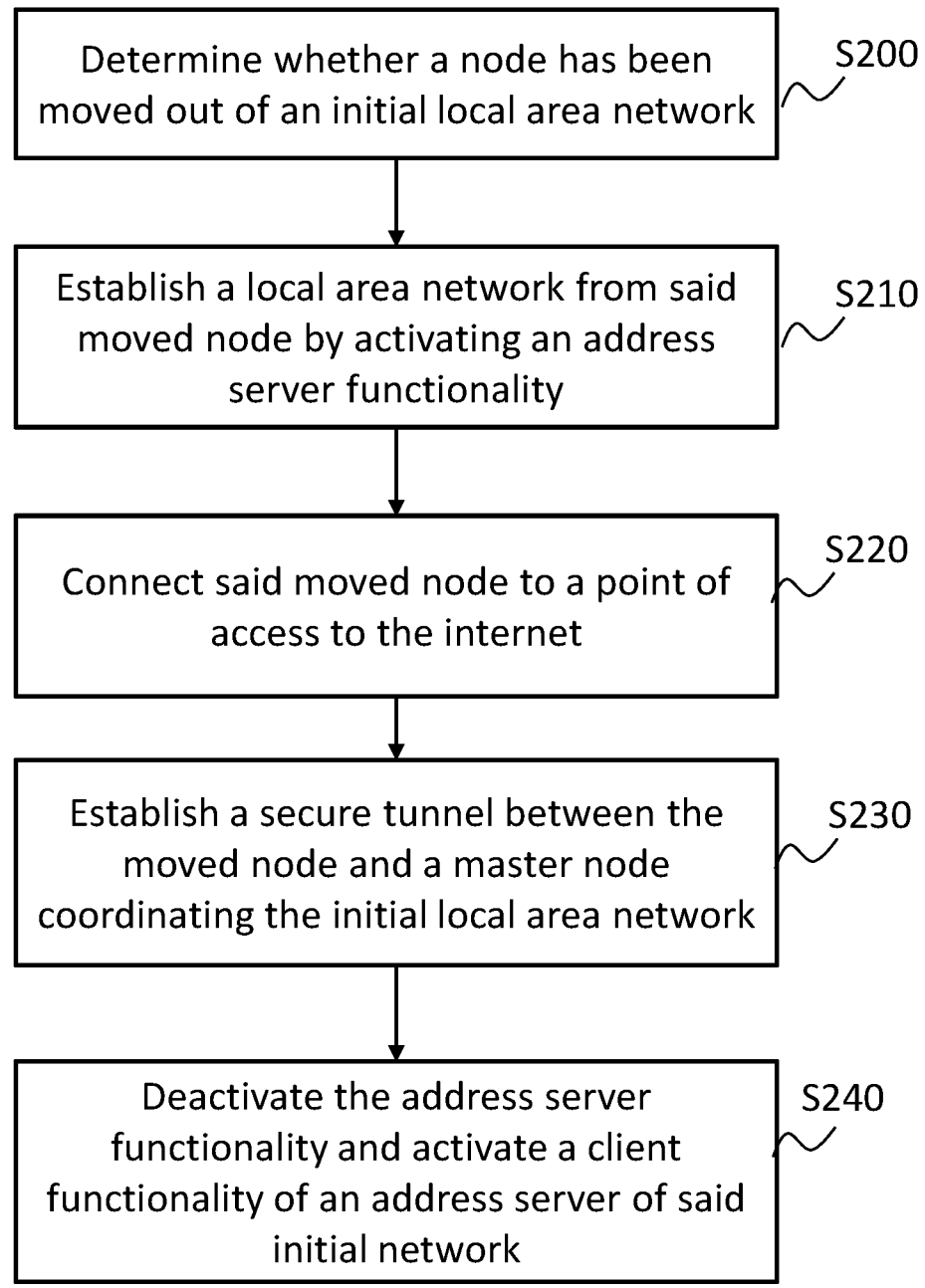
FIG. 3 illustrates schematically a method for connecting a nomadic node to an initial local area network according to a particular embodiment.

FIG. 3 illustrates schematically a method for connecting a moved node to the initial local area network LAN1.

In a step S200, the node N2 determines that it has been moved out of its initial local area network LAN1.

Figure 4A:
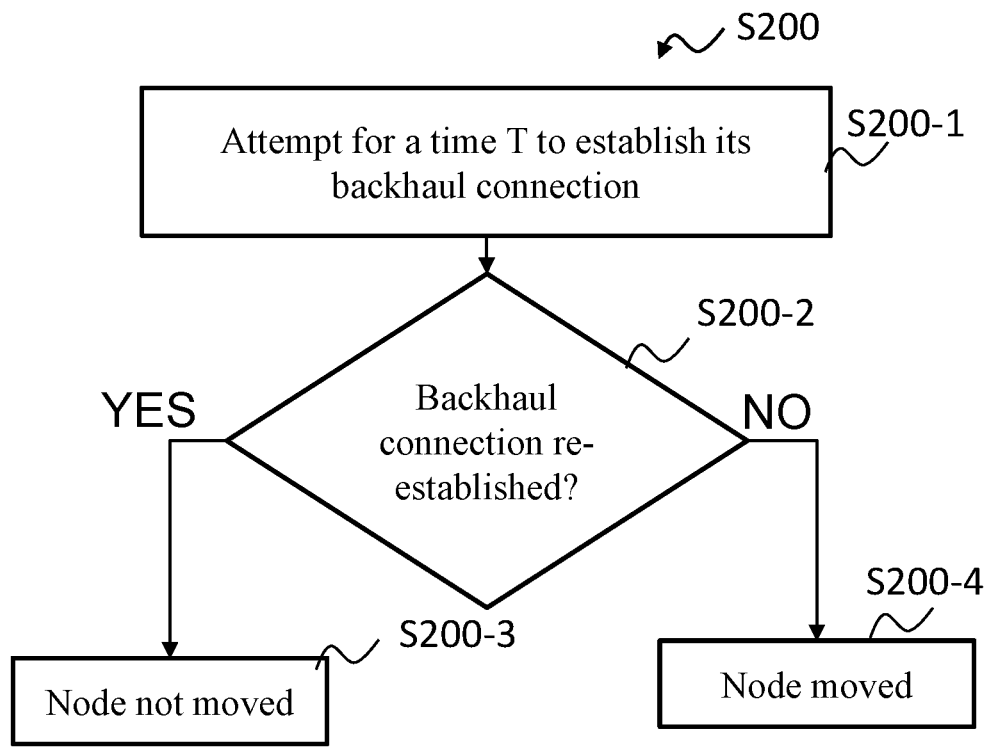
FIG. 4A illustrates schematically a particular implementation of a step of the connection method.

FIG. 4A illustrates schematically a particular performance of the step S200.

When it is powered up, the node N2 previously connected to the initial local area network LAN1 seeks to re-establish its backhaul connection (S200-1) during a time T. For example, T is equal to 2 min. For this purpose, the node N2 seeks, on its various radio interfaces, an access point the characteristics of which correspond to characteristics (e.g. the characteristics of the access point AP-BH of the node N1) stored in memory during a previous connection. One example of a characteristic is the BSSID (Basic Service Set Identifier). The prior connection took place before said node N2 was moved, i.e. when the latter still formed part of the initial local area network LAN1. If it finds such an access point, then the node N2 connects thereto, i.e. it re-establishes its backhaul connection using a conventional method of using a Wi-Fi network using a cable connection. The backhaul connection having been re-established between the node N2 and for example the node N1, then the node N2 determines that it has not been moved (S200-3). If the node has not succeeded in re-establishing this backhaul connection (S200-2), then the node N2 determines that it has been moved (S200-4).

Figure 4B:
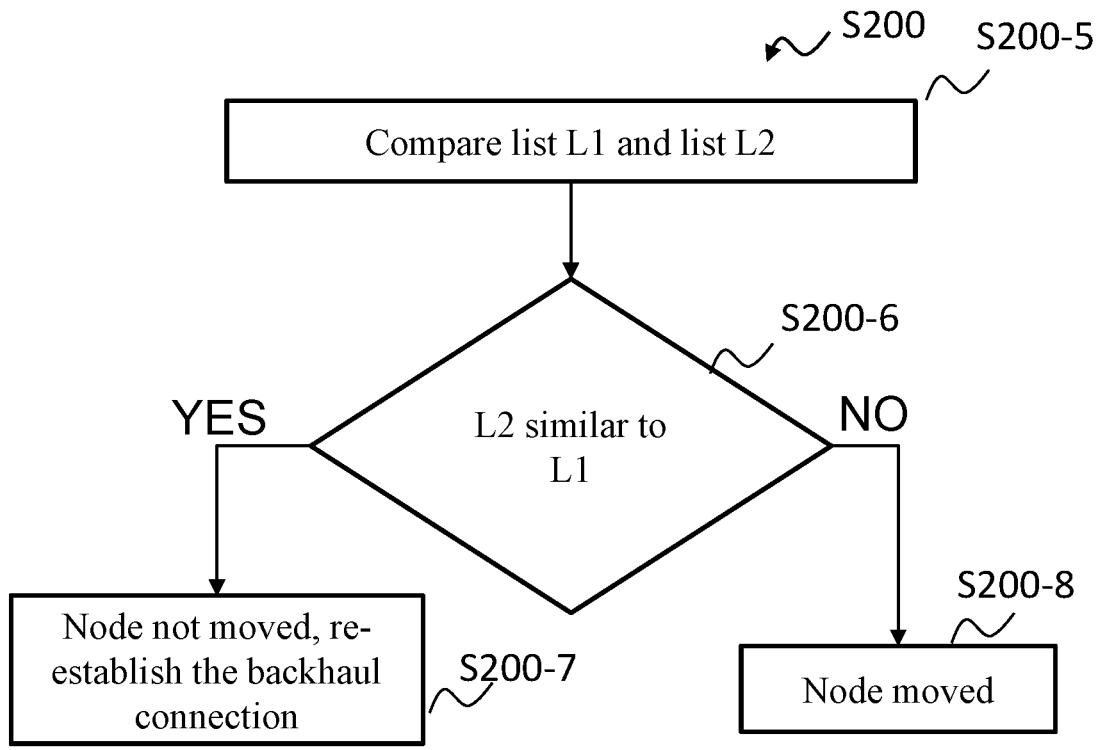
FIG. 4B illustrates schematically a particular implementation of a step of the connection method.

FIG. 4B illustrates a variant embodiment of the step S200. In a step S200-5, the node N2, when it is powered up, compares a list L1 of the access points visible in its vicinity to its radio interfaces and a list L2 stored in memory. The list L2 is a list of the access points that were visible to its radio interfaces before any movement of it. Thus, if the two lists are similar (S200-6), then the node N2 determines that it has not been moved (S200-7). It therefore re-establishes its backhaul connection. If the lists are very different, then the node N2 determines that it has been moved (S200-8). The lists are considered to be similar if a certain percentage of the access points is common to the two lists, e.g. 50%. In one embodiment, the lists are considered to be similar if the percentage P of access points of the list L1 that are located in the list L2 stored in memory is higher than a threshold value S, e.g. 40% or 50%. In the contrary case, i.e. P<S, the lists are considered to be very different. For example, if the list L1 comprises 5 access points and among these 5 access points 3 are located in the list, then the two lists are considered to be similar since 60% of the access points of L1 are located in L2. On the other hand, if among these 5 access points only one is located in the list L2, then the two lists are considered to be very different since only 20% of the access points of L1 are located in L2. In another variant embodiment, the movement of the node N2 out of the initial local area network (S200) is determined by a user by pressing on a button of the node N2 or by selecting an entry in a menu.

With reference to FIG. 3, if the node N2 determines that it has been moved out of the initial local area network, then it performs the step S210. In the step S210, the nomadic node N2 establishes a local area network LAN3 by activating an address server functionality.

Figure 1:
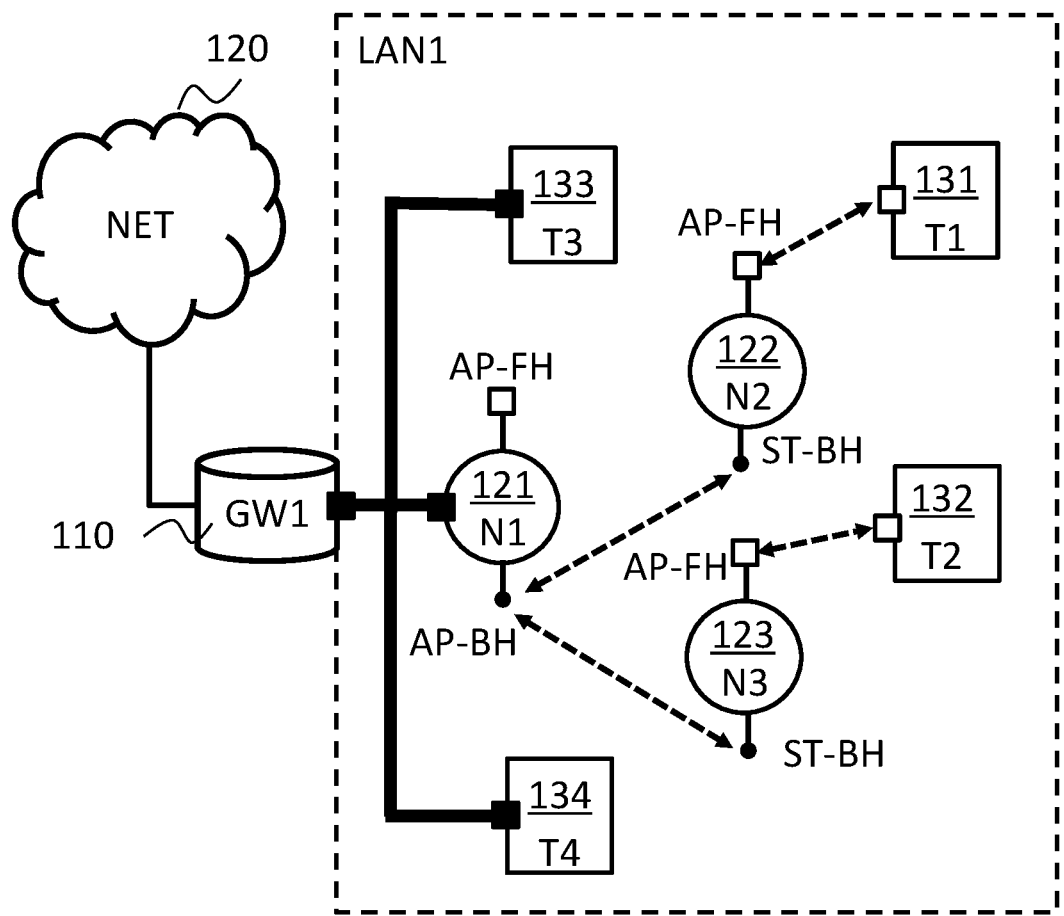
FIG. 1 illustrates schematically the architecture of a communication system comprising a wireless-communication coverage-extension system constructed around a backhaul subnetwork comprising a set of interconnected nodes.
Figure 5:
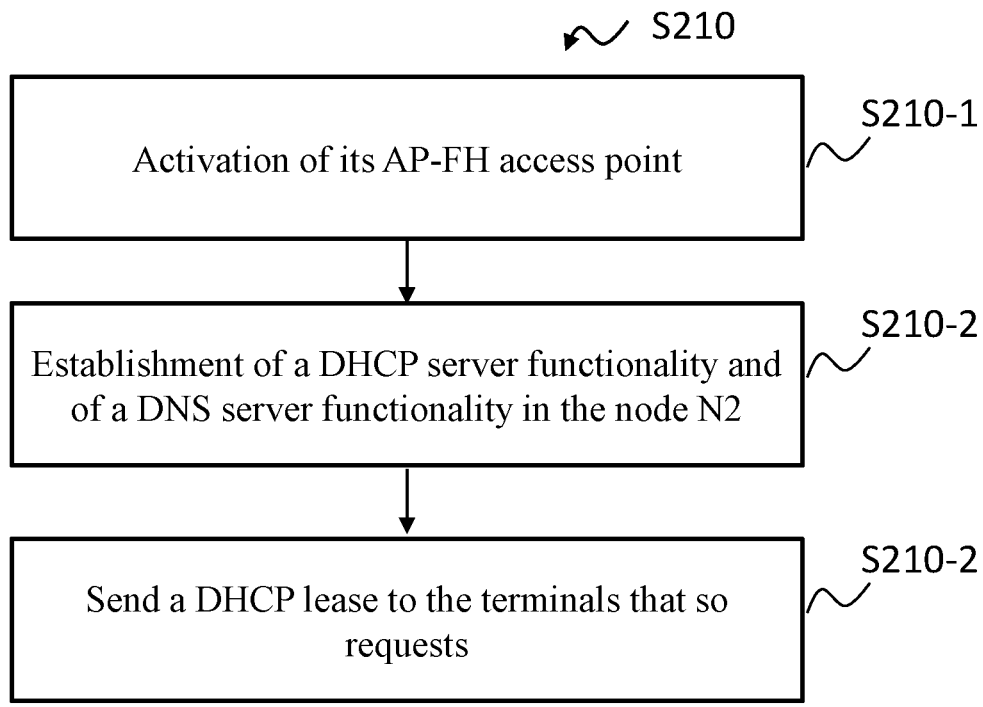
FIG. 5 illustrates schematically a particular implementation of a step of the connection method.

FIG. 5 illustrates schematically a particular performance of the step S210. In a step S210-1, the node N2 puts its access point radio interface AP-FH in operation, as configured in a normal operating situation, i.e. before the movement of the node N2. The node N2 uses in particular the same SSID and the same password as those used before the movement of the node N2, i.e. in the configuration of FIG. 1. This enables all the terminals, in this case T1 and T2 on FIG. 2, previously registered on the initial local area network to connect once again to the node N2.

In a step S210-2, the node N2 activates a DHCP (the English acronym for "Dynamic Host Configuration Protocol") server functionality that is attached to its access point AP-FH. The DHCP server hosted by N2 self-attributes a fixed IP address that is defined in a tranche of IP addresses, i.e. in the tranche 192.168.1.xxx.

The node N2 also establishes a DNS (the English acronym for "Domain Name System") server functionality that translates the domain names into IP addresses and vice versa. The IP address of the DNS server is that of the DHCP server.

In a step S210-3, the DHCP server of N2 delivers IP addresses to the terminals that request them. More precisely, the DHCP server provides a lease (the attribution of an IP address) as defined by the normative document RFC 1531, amended and supplemented by the normative documents RFC 1534, RFC 2131 and RFC 2132. A lease generally comprises an IP address and a duration of validity. Conventionally, an IP address is attributed by the broadcasting by the terminal T1 or T2 of a request of the DHCPDISCOVER type for locating a server of the DHCP type. The request of the DHCPDISCOVER type comprises the physical address (or MAC address) of the terminal. The node N2 receives the DHCPDISCOVER message on its access point AP-FH. In response, it sends a response of the DHCPOFFER type, i.e.

an offer of an IP lease, which comprises in particular the IP address of the DHCP server, as well as the IP address that it proposes to the terminal. In general, the terminal will then send a DHCPREQUEST message by which it selects an offer of an IP lease. The message DHCPREQUEST comprises the identification of the DHCP server selected. The DHCP server selected sends an acknowledgement message DHCPACK, which may in particular contain the address of the DNS server.

Thus the terminals T1 and T2 become functional vis-à-vis the local area network LAN3. The node N2 is then once again the destination of any IP request coming from T1 and T2 intended for the internet.

With reference to FIG. 3, in a step S220, the moved node is connected to a point of access to the internet. According to a particular embodiment, this access point is selected from a terminal, e.g. T1 or T2, connected to said local area network LAN3.

Figure 6:
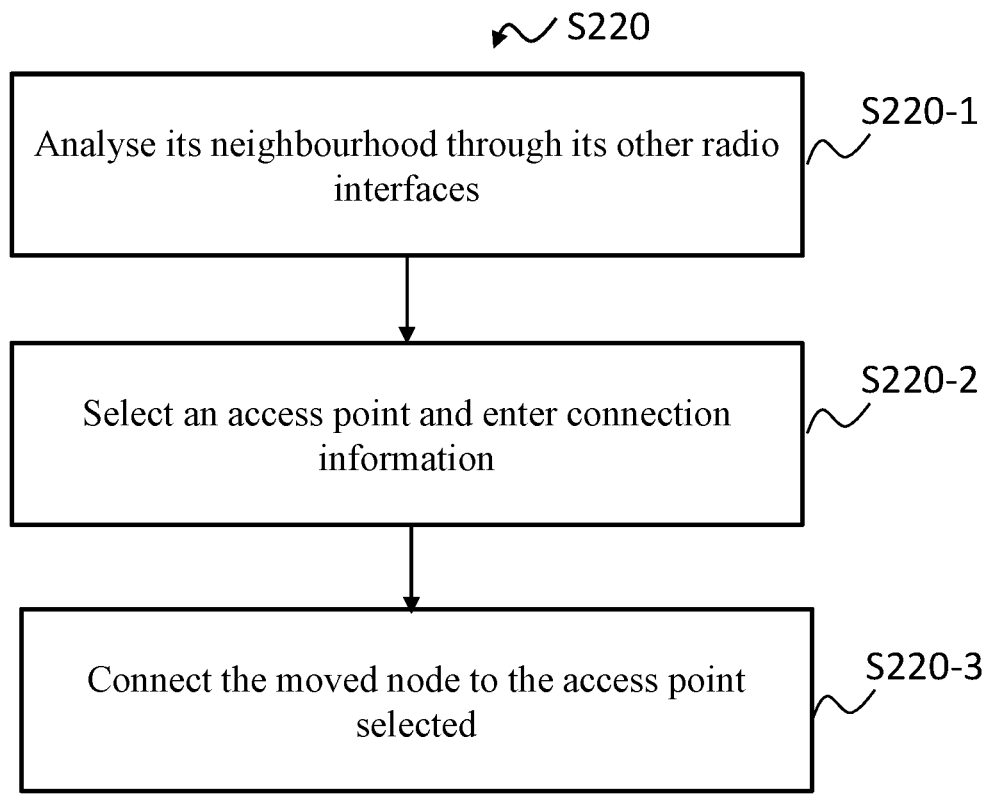
FIG. 6 illustrates schematically a particular implementation of a step of the connection method.

FIG. 6 illustrates schematically a particular performance of the step S220.

In a step S220-1, the node N2 determines a list of at least one access point to which it is able to connect. For this purpose, probe messages (request and response) are exchanged between the node N2 and other access points. By means of the exchange of these probe messages, the node N2 receives information coming from the access points, e.g. the gateway GW2, to which it is able to connect.

In a step S220-2, the node N2 presents a web page in response to any request for navigation to the internet sent by a terminal. This step is known by the name captive portal. It consists of redirecting the requests for navigation to the internet from a user to a special web page before it accesses the internet normally. This web page comprises in particular the list of access points obtained at the step S220-1. The user, through the terminal that sent the request for navigation to the internet, selects, via the web page, one of the access points in the list and enters connection information, e.g. authentication information (e.g. SSID, password), payment (e.g. credit card number), email address, etc., in order to access the internet.

In a step S220-3, the node N2 connects by its client radio interface ST-BH to the access point, i.e. to the gateway GW2 on FIG. 2, selected by the user at the step S220-3.

At the end of the step 5220, the node N2 is located at the intersection of the local area network LAN3 that the terminals T1 and T2 form part of and of the local area network LAN2 presented by the access point selected at the step S220-2, in this case the gateway GW2 on FIG. 2. The IP addresses delivered by the DHCP server installed in the node N2 must be different from the addresses used by the local area network LAN2 offered by the gateway GW2. In the particular case where there is a conflict between the two, the step S210 is reinitiated after the step S220 with a tranche of IP addresses different from those delivered by GW2, the radio interface AO-FH of the node N2 is generally reinitiated to force the terminals to reconnect and to obtain an IP address in LAN3 belonging to the new tranche of IP addresses.

Being at the intersection of the two networks LAN2 and LAN3, the node N2 uses a routing functionality for routing to the gateway GW2 the data intended for the internet transmitted by the terminals of its local area network LAN3.

It thus fulfils the role of intermediate gateway or concentrator. It enables the terminals T1 and T2 to access the internet through a single physical connection to the network LAN2, which is supported by the node N2.

With reference to FIG. 3, in a step S230, a secure tunnel is established between the moved node N2 and a master node of the initial local area network, in this case N1 on FIG. 2. For this purpose, a logic interface IL.N2 is mounted in the node N2 on the LAN3 side and a logic interface IL.N1 is mounted in the node N1. A tunnel is then established between the two logic interfaces. Thus all the traffic in the node N2 intended for IL.N2 will be found on IL.N1 in the node N1. The parameters (e.g. certificates) for access to the secure tunnel are configured and therefore known to all the nodes in the initial local area network LAN1. For example, the parameters are generated and stored for each node in the initial local area network LAN1 when they are connected to the initial local area network LAN1 or at the time of their first communication with the initial local area network LAN1. In particular, the node N2 has knowledge of these parameters before it is moved, i.e. when it physically formed a part of the initial local area network LAN1. An example of a method for configuring these parameters is illustrated on FIG. 7. FIG. 8 illustrates schematically a particular performance of the step S230.

With reference to FIG. 3, in a step S240, the address server functionality of the moved node is deactivated and a client functionality of an address server of said initial local area network LAN1 is activated.

According to a particular embodiment, the DHCP server established at the step S210-2 is deactivated and a client functionality of a DHCP server is activated. The fixed IP address attributed to the DHCP server hosted by the node N2 at the step S210-2 is therefore deleted. The Wi-Fi connections between the radio interface AP-FH and the terminals are rebooted by switching off the radio interface and switching it on again. In a variant, disassociation requests are sent. In this way, the node N2 and the terminals connected to the access point AP-FH of the node N2 each obtain an IP address supplied by the DHCP server of the LAN1. Thus N2 and the terminals T1 and T2 form part of the LAN1. A backhaul connection is established between the nomadic node N2 and the master node N1. In this way, the nomadic node N2 is an extension of the wireless-communication coverage system.

The routing table then updates itself all by itself. The routing table being updated, if the terminal T1 seeks to join an address that does not form part of the initial local area network LAN1, the routing propagates the messages to GW2. The terminals T1 and T2 connected directly to N2 thus share the access to the internet provided by GW2.

The terminals, whether they are connected to the part that has remained local, or to the nomadic node N2, are therefore connected to the same initial local area network LAN1. Thus the terminal T1 and T2 can access the services (e.g. installation of a network disc by means of a particular protocol of the Samba type, sending of a video stream to a connected TV using a particular protocol of the Chromecast type, etc.) offered by the LAN1 as if they were at home. For example, the terminal T1, if it is provided with a UPnP (the English acronym for "Universal Plug and Play") browser functionality can access the multimedia content offered by an NAS server, e.g. the node N3, provided with the same UPnP functionality. The terminals T1 and T2 can also when moving benefit from the same firewall as at home.

Figure 7:
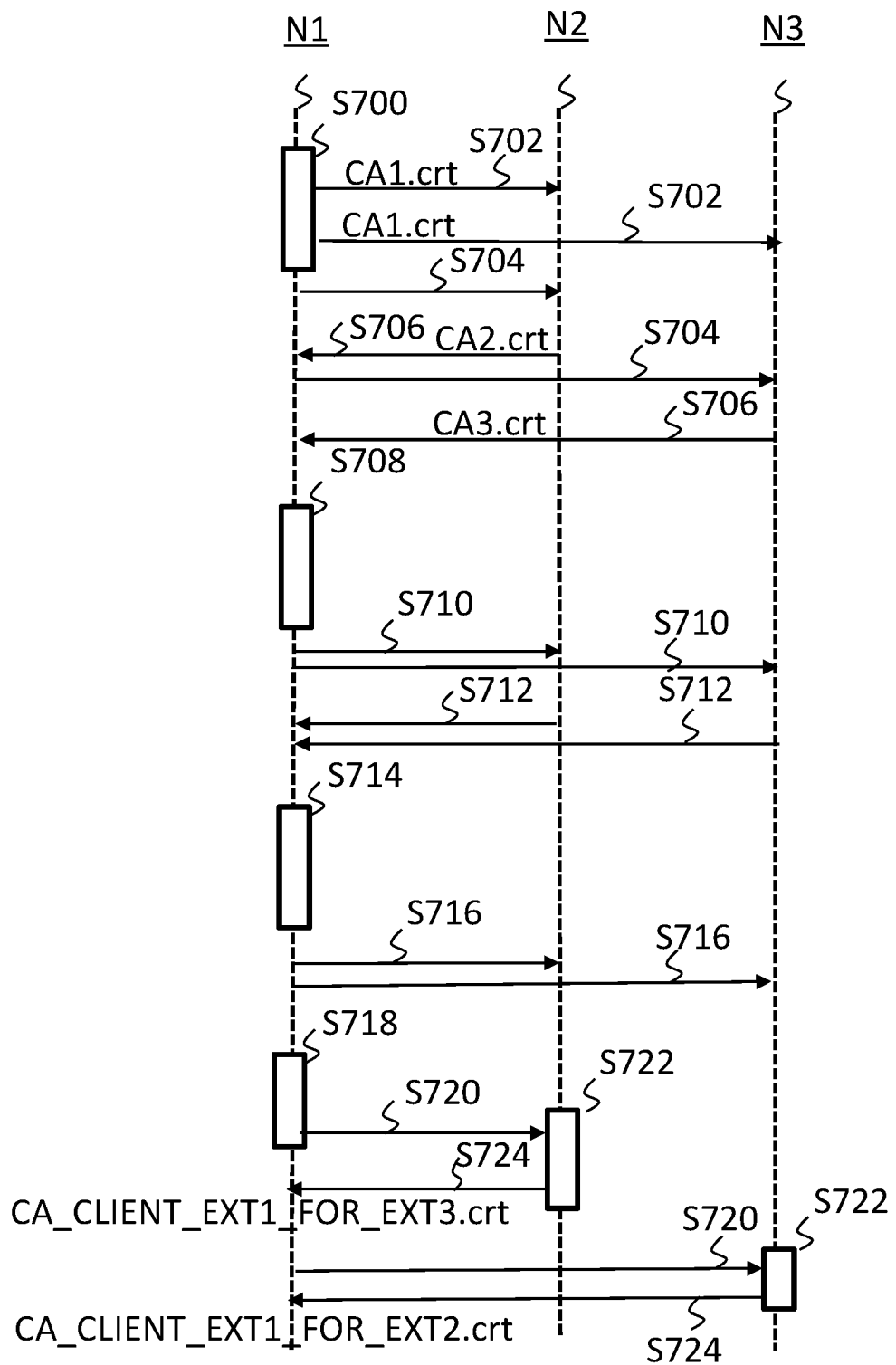
FIG. 7 illustrates schematically a method for configuring parameters (e.g. certificates, public and private keys) useful to the implementation of a secure tunnel.
Figure 8:
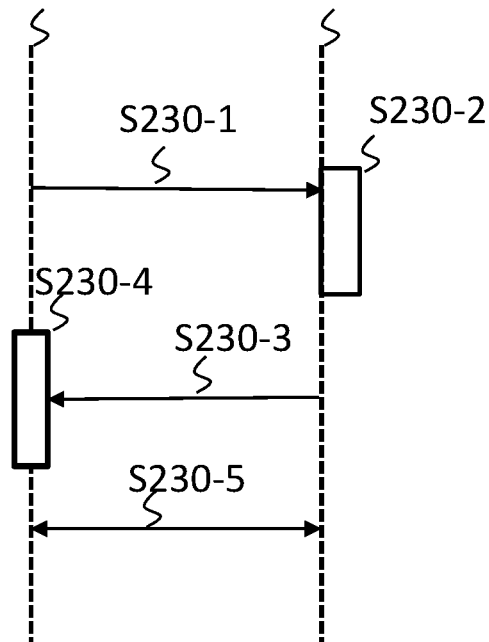
FIG. 8 illustrates schematically a particular implementation of a secure tunnel between a master node and a nomadic node.

FIG. 7 illustrates schematically a method for configuring, in the nodes of the initial local area network LAN1, parameters (e.g. certificates, public and private keys) useful for implementing a circular tunnel. On FIG. 7, the node N1 is supposed to be a new node of the initial local area network LAN1 whereas the nodes N2 and N3 are supposed to be already present in the initial local area network LAN1. The configuration of the parameters for the node N1 takes place for example when it is connected to the initial local area network LAN1.

In a step S700, the node N1 creates a certification authority that sends a root certificate CA1.*crt*. This root certificate is self-signed for its distinguished name, e.g. its domain name, with an associated private key. Generally, a certificate is sent by a certification authority. It contains a public key and various items of information relating mainly to the identity of the sender.

In a step S702, the node N1 sends its self-signed root certificate CA1.*crt* to all the other nodes connected to the initial local area network LAN1, in particular to N2 and N3.

In a step 5704, the node N1 sends, to all the other nodes connected to the initial local area network LAN1, in particular to N2 and N3, a request to collect a root certificate.

In a step S706, the node N1 receives the self-signed root certificates sent by the certification authorities of the nodes N2 and N3, i.e. CA2.*crt* and CA3.*crt* respectively.

In a step S708, the node N1 generates a server PKi (the English acronym for "Public Key Infrastructure") the public key of which is signed with its root certificate CA1.*crt*. The public key will be transmitted by a server application managing the tunnel (e.g. server VPN/TLS) via the certificate CA_SERVER_EXT1.*crt* at the time of establishment of the connection. It will enable a client application managing the tunnel (e.g. client VPN/TLS) to identify the server PKi in a sure manner by means of its validation by the root certificate CA1.*crt*.

In a step S710, the node N1 sends, to the other nodes of the network, in particular N2 and N3, a request to generate a client Pki. On reception of this request, the nodes N2 and N3 generate a client Pki and send a certificate signing request (CSR) to the node N1. The CSR contains information identifying the sending node, and the public key selected by said node. The corresponding private key is not included in the CSR, but is used to digitally sign the request.

In a step S712, the node N1 receives the CSRs from the nodes N2 and N3.

In a step S714, the node N1 signs the CSRs received with its root certificate CA1.*crt*.

In a step S716, the node N1 sends to the nodes N2 and N3 their CSRs signed by its root certificate. The CSR sent by the node N2 and signed by the root CA of N1 is denoted CA_CLIENT_EXT2_FOR_EXT1.*crt* and the CSR sent by the node N3 and signed by the root CA of N1 is denoted CA_CLIENT_EXT3_FOR_EXT1.*crt*.

In a step S718, the node N1 will also generate a client Pki and, in a step S720, send a CSR to all the nodes of the initial local area network LAN1, in particular N2 and N3.

The nodes of the network will then, in a step S722, sign the CSR received from the node N1 with their own root certificate. The signed CSR is then returned to the node N1. The CSR sent by the node N1 and signed by the root CA of N2 is denoted CA_CLIENT_EXT_FOR_EXT2.*crt* and the CSR sent by the node N1 and signed by the root CA of N3 is denoted CA_CLIENT_EXT_FOR_EXT3.*crt*.

All the private keys (CA, server PKi and client PKi) can be encrypted using the PEM (the English acronym for "Privacy Enhanced Mail") technology with a secret known only to the node (e.g. the use of a buried hardware secret if such a secret is available). This guarantees that equipment that managed to steal this information would not be able to use it. A TMP (the English acronym for "Trusted Platform Module") cryptoprocessor is an example of such a buried hardware secret. It secures a system by integrating encryption keys in the hardware. The keys, which may be unique per equipment, are flashed at the factory and can no longer ever be read. The crypto-processor supplies encryption/deciphering programming interfaces ("Application Programming Interface" or API) but never discloses the keys.

The nodes of the initial local area network LAN1 also need to know the domain name corresponding to the gateway GW1 as well as a specific port number for joining it in order to establish a secure tunnel with the master node. The port number is predefined, for example S253. The domain name was registered in the dynamic DNS or DynDNS, at manufacture, or on a user configuration.

At the end of the configuration, each node of the LAN1 thus has:

a) A DH (the English acronym for Diffie-Hellman) key for encrypting the tunnel;
b) The private key of its certification authority and the root certificates of all the extenders (including its own);
c) The private key of its server Pki and the associated certificate, i.e. CA_SERVER_EXT1.*crt*;
d) The private key of its client Pki and the client certificates delivered by all the nodes (except its own);
e) The domain name corresponding to the gateway GW1; and
f) The specific port number to be used for joining it in order to establish the tunnel.

At the end of the configuration, each node therefore has available all the parameters for establishing a secure tunnel as master node of the initial local area network LAN1 or as nomadic node.

Thus the master node of the initial local area network LAN1 can start a VPN server using the private key of its Pki server, the associated certificate, the root certificate that was used for encrypting it and its DH key. Advantageously, the server will be established only when at least one of the nodes is detected as being absent.

FIG. 8 illustrates schematically a particular implementation of a secure tunnel between a master node N1 and a nomadic node N2. In one example embodiment, the establishment of the secure tunnel is in accordance with the TLS protocol that is the successor of SSL. This protocol is described in particular in the following documents: RFC 4346 TLS v1.1, RFC 5246 TLS v1.2 and RFC 8466 TLS v1.3. More precisely, section 7.3 of the document RFC 5246 TLS v1.2 describes the "Handshake protocol" that describes in particular how a server and a TLS client can authenticate themselves in particular by exchanging their certificates.

In a situation of mobility of one of the nodes, in this case N2, the gateway GW1 is configured for allowing the requests for establishing the tunnel to reach the master node (N1 in the example of FIG. 2). Thus a request arriving on a predefined port (for example 5253) on a WAN (the English acronym for "Wide Area Network") interface of GW1 is redirected to the master node N1, which is in a position to process the request.

The nomadic node N2 can at any time attempt to connect a secure tunnel, e.g. a VPN tunnel, using a triplet (the private key of its Pki client, the associated certificate, e.g. CA_CLIENT_EXT2_FOR_EXT1.*crt*, and the root certificate that was used to encrypt it, e.g. CA1.*crt*) intended for the domain name corresponding to the gateway GW1 through the predefined port number. A connection using this information will be possible only with the node containing the private key associated with the root certificate.

In a step S230-1, the nomadic node N2 sends a connection request to the node N1. The connection request comprises a certificate CA_CLIENT_EXT2_FOR_EXT1.*crt*. The VPN/TLS server will accept a client only when the certificate is signed by the certification authority of the master node. This guarantees that the client is well known and authorised.

In a step S230-2, the node N1 validates the certificate received using CA1.crt. Thus the node N2 is identified by the node N1 as belonging to the local area network LAN1.

In a step S230-3, the node N1 confirms the connection request by sending a certificate CA_SERVER_EXT1.crt.

In a step S230-4, the node N2 validates the certificate received using CA1.crt. Thus the node N1 is identified by the node N2 as being the node targeted for establishing the tunnel.

Consequently, the dialogue between the nodes N1 and N2 is authenticated and a tunnel is established in a step S230-5, which is encrypted by a DH (the English acronym for "Diffie-Hellman") key.

Optionally, the private key of the nomadic node N2 is protected by a buried hardware secret. It is thus impossible for a foreign nomadic node or malevolent equipment knowing the private key to connect to the local area network LAN1.

In the case of failure of the connection, for example if the master has changed since the departure of the nomadic node N2 and is no longer the node N1, the nomadic node uses the following triplet (private key of its Pki client, associated certificate, e.g. CA_CLIENT_EXT2_FOR_EXT3.crt, root certificate used for encrypting it, e.g. CA3.crt), until the connection succeeds.

Figure 9:
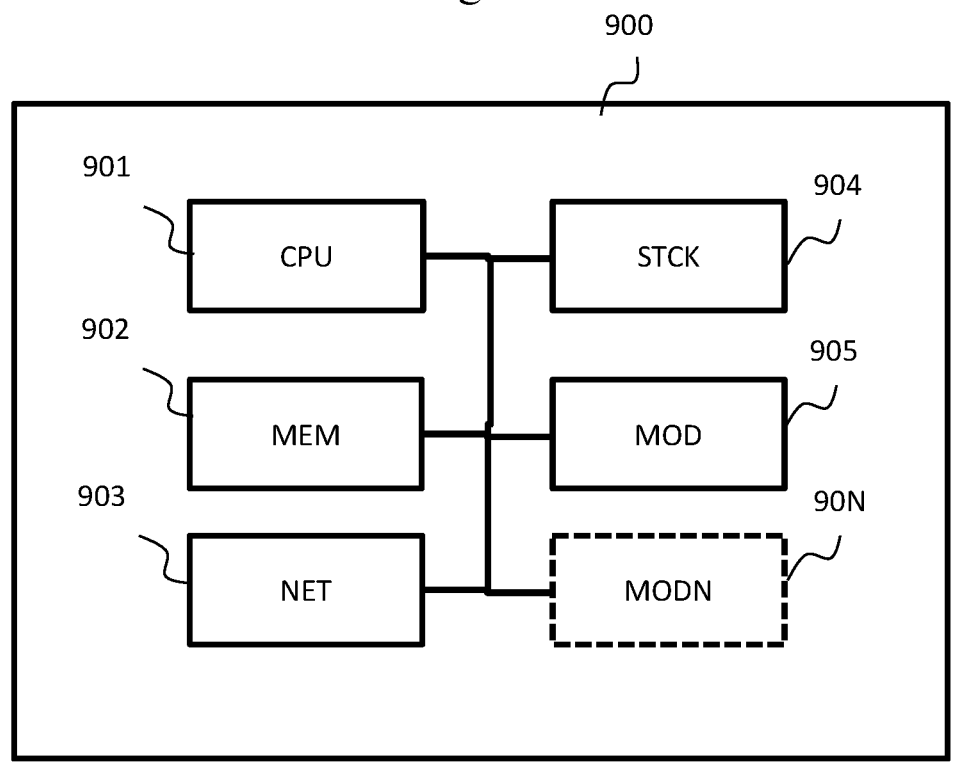
FIG. 9 illustrates schematically the hardware architecture of a node of a wireless communication network, the node being configured for performing all or some of the steps of the methods illustrated in FIGS. 3 to 8.

FIG. 9 illustrates schematically the hardware architecture of an electronic device or node of a wireless communication network, the node being configured for performing all or some of the steps of the methods illustrated in FIGS. 3 to 8.

Thus the electronic device 900 comprises, connected by a communication bus: a processor or CPU (central processing unit) 901; a memory MEM 902 of the RAM (random access memory), ROM (read only memory) and/or EPROM (erasable programmable read only memory) type, possibly a network module NET 903, for example of the Ethernet type, a storage module STCK 904 of the internal storage type and possibly a plurality of radio-frequency modules 905 to 90N in accordance with a standard of the IEEE 802.11 type. The electronic device 900 may optionally comprise one or more input/output interfaces, not shown on FIG. 9 (e.g. a keyboard, a mouse, a touchpad, a web cam, etc.), each being configured for displaying information and/or enabling a user to enter commands or data. The electronic device 900 may also comprise an energy source, not shown on FIG. 9, which may also be external to the electronic device.

The storage module STCK 904 may be of the hard disk HDD (Hard Disk Drive) or SSD (Solid-State Drive) type, or of the external storage medium reader type, such as an SD (Secure Digital) card reader.

The processor CPU 901 can record data, or information, in the memory MEM 902 or in the storage module STCK 904. The processor CPU 901 can read data recorded in the memory MEM 902 or in the storage module STCK 904. These data may correspond to configuration parameters, e.g. the certificates. The network module NET 903, if present, typically allows the connection of the electronic device 900 to a local area network and/or to the internet. Each radio-frequency module 905 to 90N enables the electronic device 900 to establish a plurality of radio-frequency interfaces in accordance with a so-called Wi-Fi standard. A radio-frequency interface may be an access point, i.e. AP-FH or AP-BH, or on the contrary a so-called user radio-frequency interface, ST-BH, allowing an association with a so-called access-point radio-frequency interface of another electronic device.

The processor CPU 901 is capable of executing instructions loaded in the memory MEM 902, for example from the storage module STCK 904. When the electronic device 900 is powered up, the processor CPU 901 is capable of reading instructions from the memory MEM 902 and executing them. These instructions form a computer program causing the implementation, by the processor CPU 901, of all or some of the methods and steps described above, and particularly the method described in FIGS. 3 to 8. Thus all or some of the methods and steps described above can be implemented in software form by executing a set of instructions by a programmable machine, such as a DSP (digital signal processor) or a microcontroller. All or some of the methods and steps described here can also be implemented in hardware form by a machine or a dedicated component, such as an FPGA (field-programmable gate array) or an ASIC (application-specific integrated circuit). The functions of the electronic device 900 can be integrated in a node of a wireless network in accordance with an IEEE 802.11 standard by updating software, i.e. for example by updating the microprogram (firmware) of the electronic device 900.

The invention claimed is:

1. A method for connecting a node of a wireless-communication coverage-extension system comprising a backhaul subnetwork in tree form comprising a set of nodes interconnected by wireless or cable by so-called backhaul connections, a plurality of backhaul subnetwork nodes implementing an access-point functionality of one and the same wireless communication network, the wireless-communication coverage-extension system being adapted for making it possible to connect devices to the nodes by means of the wireless communication network or by cable in order to form an initial local area network, the connection method comprising the following steps performed by said node:
   determining whether the node has been moved out of the initial local area network;
   and, in the case where the node has been moved:
      establishing a local area network from the moved node by activating an address-server functionality;
      connecting the moved node to a point of access to the internet;
      establishing a secure tunnel between the moved node and a master node coordinating the initial local area network;
      deactivating the address-server functionality and activating a client functionality of an address server of the initial local area network.

2. The method according to claim 1, wherein determining whether the node has been moved out of the initial local area network comprises:
   attempting to establish, during a predefined time, a backhaul connection between the node and at least one other node of the backhaul subnetwork;
   determining that the node has been moved out of the initial local area network in the case where the attempt has failed.

3. The method according to claim 1, wherein determining whether the node has been moved out of the initial local area network comprises: determining that the node has been moved out of the initial local area network in the case where a list of access points visible to a radio interface of the node is very different from a second list of access points stored in memory, the second list being a list of access points that were visible to the radio interface when the node was in the initial local area network.

4. The method according to claim 1, wherein establishing a local area network from the moved node by activating an address-server functionality comprises:
- putting its access-point functionality of the wireless communication network in operation;
- establishing a DHCP server functionality and a DNS server functionality; and
- sending a DHCP lease to the terminals that so request.

5. The method according to claim 1, wherein connecting the moved node to a point of access to the internet comprises:
- determining a list of at least one access point to which the node can connect;
- selecting an access point in the list from a web page displayed on a screen of a terminal connected to the moved node; and
- connecting the moved node to the selected access point.

6. The method according to claim 1, wherein the selected access point is a first access gateway to the internet.

7. The method according to claim 1, wherein establishing a secure tunnel between the moved node and the master node, the master node being connected to a second access gateway to the internet, comprises:
- a) sending a connection request to a domain name corresponding to the second gateway through a predefined port, the connection request comprising a client certificate of the moved node signed by a root certificate of a current node; and
- b) if the client certificate is received and validated by the master node:
  - receiving a server certificate of the master node signed by a root certificate of the master node;
  - validating the server certificate received using the root certificate of the master node;
  - establishing a tunnel between the node and the master node;
- c) otherwise repeating the steps a) to c) until the tunnel is established between the node and the master node, the steps being repeated with the connection request comprising a client certificate of the moved node signed by a root certificate of another node different from the current node.

8. A node of a wireless-communication coverage-extension system comprising a backhaul subnetwork in tree form comprising a set of nodes interconnected by wireless or cable by so-called backhaul connections, a plurality of nodes of the backhaul subnetwork implementing an access-point functionality of the same wireless communication network, the wireless-communication coverage-extension system being adapted for making it possible to connect devices to the nodes by means of the wireless communication network or by cable in order to form an initial local area network, the node being configured for performing the steps of the method according to claim 1.

9. A non-transitory storage medium storing a computer program comprising instructions for implementing, by a node of a backhaul subnetwork of a wireless-communication coverage-extension system, the method according to claim 1, when the program is executed by a processor of the node.

* * * * *